United States Patent
Amthor et al.

(10) Patent No.: US 12,124,021 B2
(45) Date of Patent: Oct. 22, 2024

(54) MICROSCOPE AND METHOD WITH IMPLEMENTATION OF A CONVOLUTIONAL NEURAL NETWORK

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 395 days.

(21) Appl. No.: 17/775,768

(22) PCT Filed: Nov. 13, 2020

(86) PCT No.: PCT/EP2020/082160
§ 371 (c)(1),
(2) Date: May 10, 2022

(87) PCT Pub. No.: WO2021/094597
PCT Pub. Date: May 20, 2021

(65) Prior Publication Data
US 2022/0382038 A1   Dec. 1, 2022

(30) Foreign Application Priority Data

Nov. 15, 2019  (DE) .................. 10 2019 130 930.1

(51) Int. Cl.
*G02B 21/36*   (2006.01)
*G02B 21/06*   (2006.01)
(Continued)

(52) U.S. Cl.
CPC ........... *G02B 21/367* (2013.01); *G02B 21/06* (2013.01); *G06N 3/08* (2013.01); *G06V 10/82* (2022.01); *G06V 20/698* (2022.01)

(58) Field of Classification Search
CPC ...... G02B 21/06; G02B 21/08; G02B 21/367; G06F 18/2413; G06N 3/045; G06N 3/08; G06N 3/082; G06V 10/82; G06V 20/698
See application file for complete search history.

(56) References Cited

U.S. PATENT DOCUMENTS

| | | | |
|---|---|---|---|
| 2016/0034788 A1* | 2/2016 | Lin ...................... | G06V 10/764 382/157 |
| 2017/0316312 A1* | 11/2017 | Goyal ..................... | G06F 17/16 |

(Continued)

FOREIGN PATENT DOCUMENTS

| | | |
|---|---|---|
| CA | 2948499 A1 | 5/2018 |
| CN | 108427958 A | 8/2018 |

(Continued)

OTHER PUBLICATIONS

Mohammad Rastegari," XNOR-Net: ImageNet Classification Using Binary Convolutional Neural Networks", Sep. 17, 2016, Computer Vision—ECCV2016, PartIV, LNCS 9908, pp. 525-535.*

(Continued)

*Primary Examiner* — Omar S Ismail
(74) *Attorney, Agent, or Firm* — LaBatt, LLC

(57) ABSTRACT

A method for processing microscope images in order to generate an image processing result comprises: implementing a convolutional neural network, wherein a first convolutional layer calculates an output tensor from an input tensor formed from a microscope image. The output tensor is input into one or more further layers of the convolutional neural network in order to calculate the image processing result. The first convolutional layer comprises a plurality of filter kernels. At least several of the filter kernels are respectively representable by at least one filter matrix with learning parameters and dependent filter matrices with implicit parameters, which are determined by means of the learning parameters and one or more weights to be learned, (Continued)

wherein the filter matrices with learning parameters of different filter kernels are different from one another and different layers of the output tensor are calculated by different filter kernels.

15 Claims, 7 Drawing Sheets

(51) Int. Cl.
    *G06N 3/08*         (2023.01)
    *G06V 10/82*       (2022.01)
    *G06V 20/69*       (2022.01)

(56) References Cited

U.S. PATENT DOCUMENTS

| | | | |
|---|---|---|---|
| 2018/0005074 A1* | 1/2018 | Shacham | G06T 1/60 |
| 2019/0042911 A1* | 2/2019 | Koren | G06N 3/04 |
| 2019/0147584 A1* | 5/2019 | Onoro-Rubio | G06N 3/08 382/100 |
| 2019/0206056 A1* | 7/2019 | Georgescu | G06T 7/0014 |
| 2019/0228836 A1* | 7/2019 | Zhang | G16B 40/20 |
| 2019/0286980 A1* | 9/2019 | Backhus | G06N 20/10 |
| 2019/0333199 A1* | 10/2019 | Ozcan | G06T 5/70 |
| 2020/0082062 A1* | 3/2020 | Mequanint | G06F 21/44 |
| 2020/0134465 A1* | 4/2020 | Seo | G06F 17/16 |
| 2020/0175351 A1* | 6/2020 | Rocznik | G06N 3/08 |
| 2020/0175352 A1* | 6/2020 | Cha | G06N 3/04 |
| 2021/0043275 A1* | 2/2021 | Landau | G16B 20/00 |
| 2021/0201115 A1* | 7/2021 | Laszlo | G06V 30/18057 |
| 2021/0224951 A1* | 7/2021 | Ahn | G06T 3/4007 |
| 2021/0287354 A1* | 9/2021 | Kumar | G06T 7/10 |
| 2021/0343012 A1* | 11/2021 | Xiao | G06T 7/90 |

FOREIGN PATENT DOCUMENTS

| | | |
|---|---|---|
| CN | 109086773 A | 12/2018 |
| CN | 110232719 A | 9/2019 |
| DE | 102017113733 A1 | 1/2018 |
| WO | 2018067962 A1 | 4/2018 |

OTHER PUBLICATIONS

Gaihua Wang et al., "An multi-scale learning network with depthwise separable convolutions," Jul. 31, 2018, IPSJ Transactions on Computer Vision and Applications (2018) 10:11, pp. 1-4.*

Sergey Ioffe, "Batch Normalization: Accelerating Deep Network Training by Reducing Internal Covariate Shift," Proceedings of the 32nd International Conference on Machine Learning, Lille, France, 2015. JMLR: W&CP vol. 37,pp. 1-6.*

Yunhui Guo et al., "Depthwise Convolution Is All You Need for Learning Multiple Visual Domains," Jul. 17, 2019, The Thirty-Third AAAI Conference on Artificial Intelligence (AAAI-19), pp. 8368-8374.*

Yair Rivenson et al., "Deep learning microscopy," Nov. 20, 2017, Optica , vol. 4,No. 11,Optical Society of America, pp. 1437-1440.*

Sascha D. Krauß et al., "Hierarchical deep convolutional neural networks combine spectral and spatial information for highly accurate Raman-microscopy-based cytopathology," May 16, 2018,J. Biophotonics. 2018;11,pp. 1-8.*

Alex Krizhevsky et al., "ImageNet Classification with Deep Convolutional Neural Networks," May 24, 2017, Communications of The ACM, Jun. 2017, vol. 60,No. 6,pp. 84-87.*

Andrew G. Howard et al., "MobileNets: Efficient Convolutional Neural Networks for Mobile Vision Applications," Apr. 17, 2017, arXiv:1704.04861, Computer Vision and Pattern Recognition,pp. 1-6.*

Krizhevsky et al. Imagenet classification with deep convolutional neural networks. Advances in neural information processing systems. 2012. pp. 1097-1105 (pp. 1-9 in copy provided).

Chollet, François. Xception: Deep learning with depthwise separable convolutions. Proceedings of the IEEE conference on computer vision and pattern recognition. 2017. pp. 1251-1258.

Iandola et al. SqueezeNet: AlexNet-level accuracy with 50x fewer parameters and< 0.5 MB model size. arXiv preprint arXiv:1602.07360, 2016.

Howard et al. Mobilenets: Efficient convolutional neural networks for mobile vision applications. arXiv preprint arXiv:1704.04861, 2017.

Tan et al. EfficientNet: Rethinking Model Scaling for Convolutional Neural Networks. arXiv preprint arXiv:1905.11946, 2019.

Rastegari et al. Xnor-net: Imagenet classification using binary convolutional neural networks. European Conference on Computer Vision. Springer, Cham, 2016. pp. 525-542.

Ioffe et al. Batch normalization: Accelerating deep network training by reducing internal covariate shift. arXiv preprint arXiv:1502.03167, 2015.

Zoph et al. Learning transferable architectures for scalable image recognition. In: Proceedings of the IEEE conference on computer vision and pattern recognition. 2018. pp. 8697-8710.

Tan et al. Mnasnet: Platform-aware neural architecture search for mobile. In: Proceedings of the IEEE Conference on Computer Vision and Pattern Recognition. 2019. pp. 2820-2828.

Sifre et al. Rigid-motion scattering for image classification. Ph.D. thesis. 2014. http://www.cmapx.polytechnique.fr/~sifre/research/phd_sifre.pdf.

Guo et al. Depthwise Convolution is All You Need for Learning Multiple Visual Domains. arXiv:1902.00927v2, Feb. 19, 2019. https://arxiv.org/abs/1902.00927.

Yair et al. Deep Learning Microscopy. Cornell University Library. May 12, 2017. pp. 1-14, supplementary information, pp. 1-15.

Wang et al. An multi-scale learning network with depthwise separable convolutions. IPSJ Transactions on Computer Vision and Applications. vol. 10, No. 11, Jul. 31, 2018.

Haase et al. Rethinking Depthwise Separable Convolutions: How Intra-Kernel Correlations Lead to Improved MobileNets. 2020 IEEE/CVF Conference on Computer Vision and Pattern Recognition (CVPR). Jun. 13, 2020 pp. 14588-14597.

Krizhevsky et al. Imagenet classification with deep convolutional neural networks. Communications of the ACM. vol. 60. Issue 6. Jun. 2017. pp. 84-90.

Volkmer, Markus, International Search Report and Written Opinion for International Application No. PCT/EP2020/082160 (English translation available for International Search Report only), Mar. 19, 2021, 14 pages.

Office action for Chinese Application No. 202080077686.8 with English translation, Nov. 29, 2023, 16 pages.

* cited by examiner

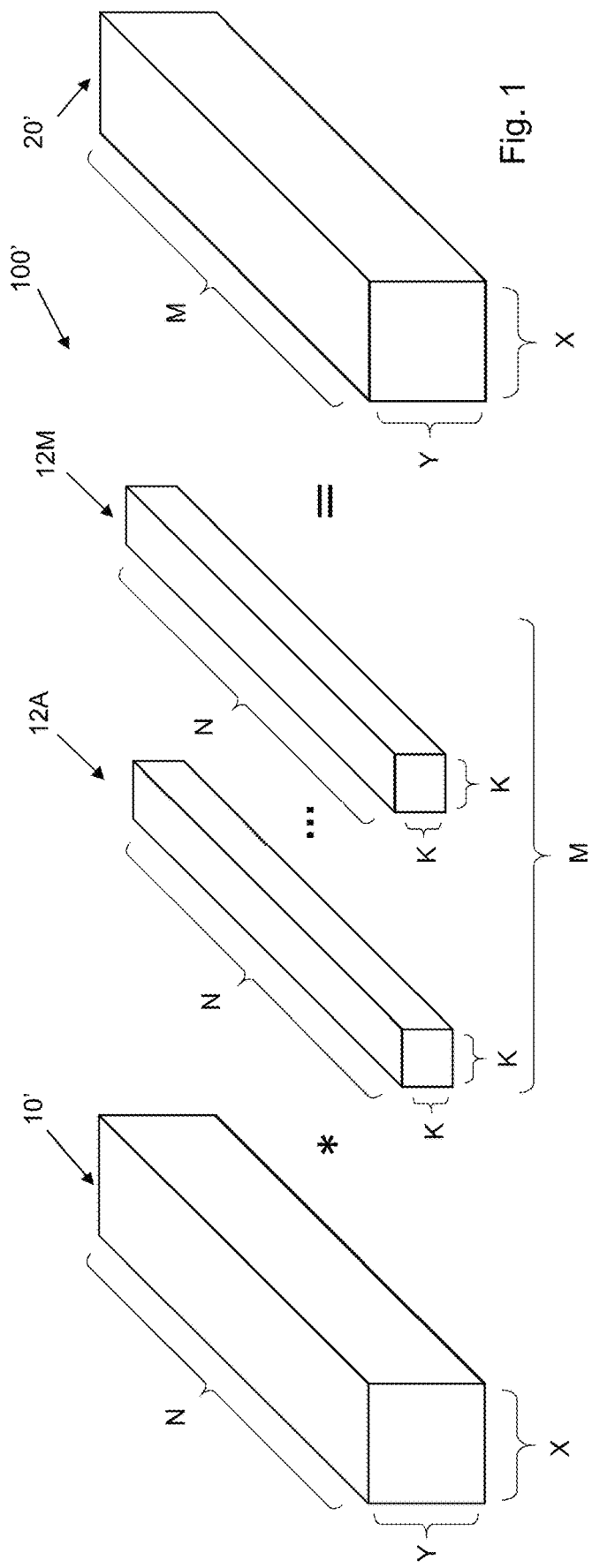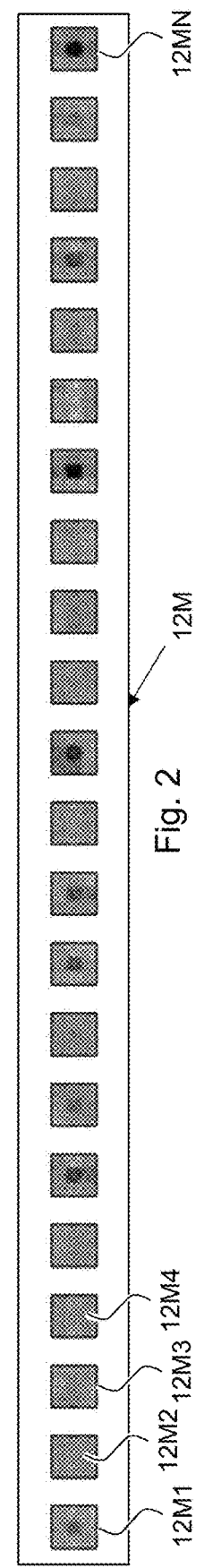

| Convolution Layer | Number of parameters | Parameter reduction by factor |
|---|---|---|
| Standard CNN | $K^2MN$ | x1 (no reduction) |
| Convolutional layer with weights according to FIG. 6 (all weights free) | $K^2M + MN$ | x9 |
| Convolutional layer with weights according to FIG. 7 (all weights constant) | $K^2M$ | $\geq$ x75 |
| Convolutional layer with weights according to FIG. 8 (weights constant column-wise) | $K^2M + N$ | $\geq$ x75 |
| Convolutional layer with weights according to FIG. 9 (weights constant row-wise) | $K^2M + M$ | $\geq$ x75 |
| Convolutional layer with weights according to FIG. 10 | $K^2M + MM` + M`N$ | $\geq$ x50 |

Fig. 11

MICROSCOPE AND METHOD WITH IMPLEMENTATION OF A CONVOLUTIONAL NEURAL NETWORK

FIELD OF THE DISCLOSURE

The present disclosure relates to a method in which a convolutional neural network is implemented. The invention also relates to a machine-readable storage medium and a microscope which is configured to implement the method.

BACKGROUND OF THE DISCLOSURE

Convolutional neural networks (CNNs) are used for a variety of different applications. Examples include image processing, a segmentation or classification of images or a detection of objects in images. The neural network can be part of a machine learning algorithm, in particular a deep learning algorithm. A microscope with a trained deep neural network for image processing is described, for example, in US 2019/0 333 199 A1.

Input data for the neural network can be images or be obtained from images captured with a microscope of a sample to be analyzed. Such a generic microscope comprises: a light source for illuminating a sample to be analyzed; an objective for guiding detection light from the sample; a camera for capturing a microscope image by means of the detection light from the objective; and a computing device configured to process the microscope image and output an image processing result.

A generic method comprises running a convolutional neural network, wherein an output tensor is calculated from an input tensor by means of a first filter layer or convolutional layer. The first convolutional layer comprises one or more filter kernels.

In the sense of this disclosure, an input tensor is understood to be a multidimensional array of data to which a calculation for generating the output tensor is applied. In the case of a three-dimensional input tensor, this can correspond, for example, to a number of N two-dimensional matrices of input data. The input tensor can also be called an activation map or feature map. It can be the output tensor generated by a previous convolutional layer or be derived from such an output tensor or be formed by raw data. The number of dimensions of the input tensor can be in principle any number or a number greater than/equal to three. The input tensor can be formed by predetermined input data which is contained in one or more lists or formed therefrom. A depth of the input tensor can also be qualified as a number of channels. For example, an input tensor can be an image in which the channels correspond to different colours; in particular, there can be three channels for RGB colours. In subsequent layers of a CNN, the depth of the input tensor is usually much higher, for example greater than 100 or 1000.

The foregoing description of the input tensor also applies mutatis mutandis to the output tensor, which is often called a feature map.

The filter kernel or filter kernels can also be referred to as filters, kernels, filter cores or, in the case of a 3D filter kernel, a convolution matrix/filter matrix of a depth N (i.e., with a number of N two-dimensional filter matrices). The term convolution matrix/filter matrix is intended to illustrate that a mathematical convolution is to occur with the input tensor, in particular a discrete convolution. An inner product of the filter kernel with a currently underlying section of the input tensor can be calculated in order to calculate one value of the output tensor. The convolution calculation method itself can take different forms, e.g., a matrix of the input tensor can first be converted into a vector, which is applied in a calculation together with a matrix formed from the filter kernel or a vector formed therefrom.

For the purposes of illustration, the implementation of a convolutional layer 100' of a convolutional neural network according to the prior art is described with reference to FIG. 1.

FIG. 1 schematically shows an input tensor 10' which is convolved with a number of M filter kernels 12A-12M, whereby the output tensor 20' is calculated. The input tensor 10' has the dimensions X×Y×N, i.e. a number of Y rows, X columns and depthwise a size of N, i.e. N different two-dimensional X×Y layers.

Each of the M filter kernels 12A-12M has the dimensions K×K×N. i.e. a number of N layers of two-dimensional K×K matrices. A 3×3 matrix or 5×5 matrix is often used, wherein N can be much larger than K, for example larger than 100 or 1000.

Convolution of the input tensor 10' with the M filter kernels 12A-12M generates the output tensor 20', which in the illustrated example has the dimensions X*Y*M. The depth of the output tensor 20' is accordingly determined by the number of filter kernels M. The convolution calculation occurs in a known manner, for example as shown in FIGS. 8-9 of DE 10 2017 113 733 A1 and briefly described in the following: each X×Y×1 layer of the output tensor is calculated by means of one of the filter kernels 12A-12M of FIG. 1. Each of the K×K×1 filter layers of this filter kernel (or its reflection) is multiplied by a section of the corresponding layer of the input tensor. This occurs for all N layers and the respective sub-results are added together to form a scalar. The employed section of the input tensor corresponds in terms of its position to the position of the calculated value in the output tensor. By sliding the filter kernel over the input tensor 10', the different values of an X×Y×1 layer of the output tensor 20' are calculated. The convolution of the next filter kernel of the M filter kernels with the input tensor 10' yields the next X×Y×1 layer of the output tensor 20'.

The total number of values/entries of the filter kernels 12A-12M here is K*K*N*M. This number of values constitutes the parameters that are to be determined with a machine learning algorithm using training data. A partially learned machine learning algorithm in which the values of the filter kernels have been set can then be applied to an input tensor in order to process or assess this data. The number of parameters K*K*N*M to be learned can be very high, for example greater than 100,000. This very large number of parameters to be determined increases computing and hardware requirements. Even if dedicated hardware is used for these calculations, the required time expenditure remains a relevant factor. It would thus be desirable to provide a filter kernel design that is as efficient as possible in which the filter kernels make good use of the information contained in the input tensor and reduce the risk with a machine learning algorithm of an overfitting to training data. The design should further facilitate calculations that are as fast as possible and be robust to variations in the data of the input tensor.

CNNs are described, for example, in the following literature in the prior art:

[1]. KRIZHEVSKY, Alex; SUTSKEVER, Ilya; HINTON, Geoffrey E. Imagenet classification with deep convolutional neural networks. In: Advances in neural information processing systems. 2012. pp. 1097-1105.

[2]. CHOLLET, François. Xception: Deep learning with depthwise separable convolutions. In: Proceedings of the IEEE conference on computer vision and pattern recognition. 2017. pp. 1251-1258.
[3]. IANDOLA, Forrest N., et al. SqueezeNet: AlexNet-level accuracy with 50× fewer parameters and <0.5 MB model size. arXiv preprint arXiv:1602.07360, 2016.
[4]. HOWARD, Andrew G., et al. Mobilenets: Efficient convolutional neural networks for mobile vision applications. arXiv preprint arXiv:1704.04861, 2017.
[5]. TAN, Mingxing; LE, Quoc V. EfficientNet: Rethinking Model Scaling for Convolutional Neural Networks. arXiv preprint arXiv:1905.11946, 2019.
[6]. RASTEGARI, Mohammad, et al. Xnor-net: Imagenet classification using binary convolutional neural networks. In: European Conference on Computer Vision. Springer, Cham, 2016. pp. 525-542.
[7]. IOFFE, Sergey; SZEGEDY, Christian. Batch normalization: Accelerating deep network training by reducing internal covariate shift. arXiv preprint arXiv: 1502.03167, 2015.
[8]. ZOPH, Barret, et al. Learning transferable architectures for scalable image recognition. In: Proceedings of the IEEE conference on computer vision and pattern recognition. 2018. pp. 8697-8710.
[9]. TAN, Mingxing, et al. Mnasnet: Platform-aware neural architecture search for mobile. In: Proceedings of the IEEE Conference on Computer Vision and Pattern Recognition. 2019. pp. 2820-2828.

The cited publications describe in particular the following CNNs, which are discussed in more detail in the following:
Xception [2]
SqueezeNet [3]
MobileNet [4]
EfficientNet [5]
NasNet/MNasNet [8, 9]
XNOR-Net [6]

These algorithms use different techniques in order to reduce the number of parameters as well as the computation time for CNNs. These techniques can be roughly divided into: microarchitectural adaptations, wherein individual building blocks of CNNs are replaced by other building blocks, e.g. the implementation of depthwise separable convolutions [2, 4, 5]; macroarchitectural adaptations, wherein the entire architecture of a CNN is adapted, e.g. in an automated search for new architectures [4, 5]; mixtures of microarchitectural and macroarchitectural adaptations [6]; a post-processing of a trained model, e.g. a compression in which model parameters are quantized or a pruning in which negligible building blocks of a CNN are removed.

These techniques can have the following disadvantages:
Microarchitectural adaptation: The implementation of depthwise separable convolutions [2, 4, 5] results in an ineffective utilization of the kernels, as each convolves only one instead of all input channels. There is thus a risk that redundancies are learned and that an unnecessarily large number of parameters are retained in the model as a result.
Macroarchitectural adaptation: automated searches for new architectures [8, 9] result in an extremely large consumption of resources (for example, of several GPU months).
Post-processing: Networks produced by pruning do not outperform architectures of a comparable size. Moreover, pruning, compression or a reduction of the architecture usually leads to a loss in performance. By contrast, it is possible to achieve a parameter reduction while maintaining or even improving performance with the present invention as described in the following.

This is attributable to the positive regularization effect which prevents an overadaptation that can occur, e.g., with very deep networks [2, 8]. This is particularly advantageous for small data sets.

In order to delimit the invention from depthwise separable convolutions (DSCs) of the prior art, a DSC is described with reference to FIG. 3. FIG. 3 shows an input tensor 10' consisting of N layers of two-dimensional matrices 10'A to 10'N, from which an output tensor 20' with M layers of two-dimensional matrices 20'A to 20'M is to be calculated by means of convolution calculations. In a DSC, this does not occur by means of a single convolution operation, but by means of two convolution operations executed in succession. In the first operation, each of the N layers of the input tensor 10' is convolved with a respective filter kernel 13A-13N, whereby a tensor (intermediate tensor) 14 is calculated. Each filter kernel 13A-13N has a depth of 1 and is thus a K×K matrix, e.g. a 5×5 matrix. In the illustrated case, the input tensor 10' has a depth N=3 so that a first layer 14A of the intermediate tensor 14 is calculated by convolving the first layer 10'A of the input tensor 10' with the filter kernel 13A, a second layer 14B of the intermediate tensor 14 is calculated by convolving the second layer 10'B of the input tensor 10' with the filter kernel 13B, and a third layer 14N of the intermediate tensor 14 is calculated by convolving the third layer 10'N of the input tensor 10' with the filter kernel 13N. The intermediate tensor 14 is now convolved/matrix multiplied with a 1×1×N filter kernel 16A, whereby a layer 20'A of the output tensor 20' is calculated. M different such filter kernels 16A-16M are used to calculate the M layers 20'A to 20'M of the output tensor 20' from the intermediate tensor 14. The value of M can be set as desired, according to the desired depth of the output tensor 20'.

To calculate a layer of the output tensor 20', e.g. the layer 20'A, all filter kernels 13A-13N of the first convolution operation and one of the filter kernels 16 of the second convolution operation (namely the filter kernel 16A) are thus used. All entries of the filter kernels used in the process are parameters to be learned.

The different layers of the output tensor 20' are calculated with the same filter kernels 13A-13N of the first convolution operation. This creates an interdependency between the different layers 20'A to 20'M of the output tensor 20'. In the example shown in FIG. 3, the number of parameters to be learned is K*K*N+N*M and is consequently lower than in the case shown in FIG. 1 where all entries of the filter kernels 12A-12M are parameters to be learned, i.e. K*K*M*N parameters.

A description of a specific example of a neural network that uses depthwise separable convolutions can be found in SIFRE, Laurent; MALLAT, Stéphane: "Rigid-motion scattering for image classification", Ph.D. thesis, 2014, http://www.cmapx.polytechnique.fr/-sifre/research/phd_sifre.pdf. As illustrated in FIG. 6.3 in this document, the convolution calculation of a single layer is implemented by means of two successive convolution operations, in a similar manner to FIG. 3 of the application. In contrast to FIG. 3, however, the number of filter kernels in the first convolution operation is not equal to the depth of the input tensor ($D_m$ in FIG. 6.3); instead, there are $K_m$ times as many filter kernels so that the intermediate tensor does not have the depth $D_m$, but $D_m*K_m$. Otherwise, the explanations relating to FIG. 3 of the application also apply to this document.

Further realizations of convolutional neural networks for image processing are described in: GUO, Yunhui, et al: "Depthwise Convolution is All You Need for Learning Multiple Visual Domains," arXiv:1902.00927v2, 19 Feb. 2019, https://arxiv.org/abs/1902.00927.

SUMMARY OF THE DISCLOSURE

It can be considered an object of the invention to provide a method for processing microscope images, a computing device and a microscope which can calculate, from the microscope image, an image processing result, in particular a classification, image segmentation or object identification, in a particularly robust manner by means of a convolutional neural network, with a particularly high generalizability to unseen microscope images.

This object is achieved by means of the method with the features of the claim 1, the computing device according to claim 14 and the microscope with the features of claim 15.

Advantageous variants of the method, the computing device and the microscope of the invention are the object of the dependent claims and are also explained in the following description.

In the method of the aforementioned type, according to the invention, at least one of the filter kernels is representable by at least one filter matrix with learning parameters and dependent filter matrices with implicit parameters, which are determined by means of the learning parameters (of the filter matrix of this filter kernel) and one or more weights to be learned.

Program code configured to effect carrying out the method according to the invention when executed by a computing device is stored on a machine-readable storage medium of the invention.

In the microscope cited in the foregoing, according to the invention, the computing device is configured to calculate an input tensor from a captured microscope image and carry out the method according to the invention.

Preliminary research relating to the invention was conducted with conventional filter kernels in which all entries are freely learnable parameters. Specific values of these parameters were determined by means of a training step of a machine learning algorithm. In the process, a high correlation between the parameter values of different layers/depths (N) was determined. This is illustrated in FIG. 2, which shows the N layers of the filter kernel 12M of FIG. 1. In this example, the K×K×N filter kernel 12M is a 3×3×22 filter kernel and different greyscales stand for different numerical values. In the filter kernel 12M, the N layers 12M1 to 12MN of K×K×1 filter matrices clearly exhibit a high correlation with one another. This correlation was observed for different training data sets and machine learning applications. The existence of a correlation suggests that the high number of mutually independent parameters (which in the case of the filter kernel 12M is K*K*N, i.e. 3 3*22=198 in FIG. 2) must not be necessary. Instead, a dependency between a K×K×1 filter matrix and remaining filter matrices of this filter kernel can be predetermined, whereby the number of parameters to be learned can be significantly reduced with similar results. This dependency differs from the dependency of the depthwise separable convolution technique described in the foregoing with reference to FIG. 3. In the cited variant of the invention, a layer of the output tensor is calculated by means of a filter kernel comprising one K×K×1 filter matrix with parameters to be learned, while the remaining layers of this filter kernel are dependent on the K×K×1 filter matrix, e.g. since each layer is formed by a factor to be learned multiplied by said K×K×1 filter matrix. In FIG. 3 of the application, on the other hand, a layer of the output tensor is calculated by means of the filter kernels 13A-13N, which are independent of one another; their values are learned freely from one another. The invention thus employs a parameter reduction within a filter kernel used to calculate a layer of the output tensor (intrakernel parameter reduction), which makes it possible to exploit the redundancies or dependencies observed in experiments. In the example of FIG. 3, in contrast, there is no intrakernel parameter reduction, but rather an interkernel parameter reduction (the different layers of the output tensor are calculated by means of the same filter kernels 13A-13N).

It has proven that the reduced number of parameters to be learned not only permits faster calculations, but can also improve the robustness of a machine learning algorithm, especially with smaller amounts of training data. This is attributable to the fact that the parameter reduction acts as a kind of regularization, which prevents an overfitting of the neural network to training data. To facilitate efficient calculations, it is possible to use in particular 1×1 grouped convolutions, which offer immense speed advantages compared to standard convolutional layers. An optional visualization of deep neural networks is also facilitated due to the reduced number of parameters.

A parameter reduction is implemented in part by means of a post-processing in the prior art. The resource expenditure required for the training (memory, time, energy) remains unchanged in this case. With the present invention, in contrast, only a smaller number of parameters needs to be learned from the outset, whereby only a fraction of the computation resources is required during the training phase.

In the terminology used here, the filter matrix with learning parameters denotes a matrix of a filter kernel, for example a 2D matrix of a 3D filter kernel. Higher dimensions are also possible, the terms convolution matrix/filter matrix as used here denoting a layer of a filter kernel. Learning parameters denote parameters whose values are to be learned by a machine learning algorithm using training data. The number of parameters (learning parameters) can in particular be equal to the size of the matrix, i.e. there can be nine learning parameters in the case of a 3×3 matrix. Other matrices of this filter kernel are intended to be dependent on this filter matrix with learning parameters and are thus called "filter matrices with implicit parameters". The designation "implicit parameters" is intended to illustrate that these parameters are not learned independently/freely relative to one another. Rather, the implicit parameters are described with a mathematical dependency on the filter matrix with learning parameters, wherein at least one weight to be learned is also applied. For example, the filter matrix with learning parameters can be multiplied by a weight to be learned in order to form one of the filter matrices with implicit parameters. According to this example, in the case of 3×3 filter matrices, a filter matrix with implicit parameters contains a total of 9 values/entries, but is only defined by a single weight value to be learned and by the 3×3 filter matrix with learning parameters.

The multiplication of a weight to be learned with the filter matrix with learning parameters should only be understood as an example of an implementation. Other mathematical relationships are also possible. Moreover, advantages of the invention are already at least partially achieved with only a minor reduction in the number of parameters to be learned. An upper limit for the number of weights to be learned can thus be defined so that the number of all weights to be learned plus the number of all learning parameters is smaller than the size of the filter kernel in question or of all filter kernels. The "size" of the filter kernel is intended to denote the number of its entries; in the example of FIG. 1, a filter kernel thus has a size of K×K×N and the size of all M filter kernels together is K×K×N×M.

For a larger reduction of the number of parameters to be learned, it can be provided that not only one, but a plurality or all of the filter kernels of a convolutional layer are formed in the described manner. In this case, each of these filter kernels respectively uses at least one (or exactly one) filter matrix with learning parameters, wherein the filter matrices with learning parameters of different filter kernels can be independent of one another. Thus, for example, if there are M filter kernels of a size K×K×N, there can be M filter matrices with K*K learning parameters. Weights to be learned are used together with the filter matrices with learning parameters to determine the remaining filter matrices ("dependent filter matrices"). Optionally, the same learning parameters can be used for different filter matrices in order to further reduce the number of parameters to be learned.

In the sense of the invention, at least one of the filter kernels is "representable" in the described manner with a filter matrix with learning parameters and by weights to be learned. By "representable", different specific mathematical formulations or calculation methods are understood, which equal the described filter kernel in terms of their result and which are thus representable by such a filter kernel. Thus, on the one hand, one of the filter kernels or each filter kernel can be respectively formed by a body to be convolved with the input tensor, the body being formed by the at least one filter matrix with learning parameters and the weights to be learned. Consequently, if the learning parameters and the weights are known or predetermined, each entry of this body is completely defined. A body is understood here to mean a multi-dimensional block of numbers. In an alternative implementation, one of the described filter kernels (or each filter kernel, respectively) is implemented by means of at least one first body (learning parameter body) and one second body (weights body), which are successively applied in a calculation, in particular convolved, with the input tensor. This can occur by means of a depthwise convolution combined with a pointwise convolution. The first body comprises or is formed by the filter matrix with learning parameters and in particular none of the weights to be learned. All layers, with a depth of N, can equal said filter matrix with the learning parameters here, i.e. the same K×K×1 filter matrix with learning parameters is always used for the convolution calculation. The second body, on the other hand, comprises or is formed (solely) by the weights to be learned and precisely by no learning parameters. In the case of an X×Y×N input tensor, the weight body can thus be a vector of the shape 1×1×N. The two bodies can now be convolved with the input tensor, wherein the order of the two convolution calculations is in principle unimportant. In the sense of this invention, the use of two such bodies is considered to be a possible representation of the filter kernel in question. In particular, the second body containing the weights to be learned can be multiplied by the input tensor (convolution with a 1×1×N body); if the size of the input tensor is X×Y×N, each X×Y×1 layer of the input tensor is respectively multiplied by one weight, i.e. each entry of an X×Y×1 layer is multiplied by the same weight while, according to the variant of the invention, different X×Y×1 layers can be multiplied by different weights or (in part) by the same weight. A convolution then occurs with the first body, which in principle can be formed by a K×K filter matrix alone or by a K×K×N filter matrix in which every K×K×1 layer is equal. For a simple calculation method, the N layers of the input tensor that have been multiplied by the weights can first be added together to form an X×Y×1 body, whereby merely a convolution with a K×K×1 filter matrix (which can contain the learning parameters) remains to be calculated. In an inverse order of the convolution operations, the X×Y×N input tensor is first convolved depthwise with the K×K×1 filter matrix with learning parameters or with the K×K×N filter matrix in which each K×K×1 layer can be the same, i.e. each X×Y×1 layer of the input tensor is respectively convolved with the K×K×1 filter matrix, whereby the resulting body has a depth of N; this body is then convolved pointwise with the 1×1×N weight body, whereby the resulting body has a depth of 1 and thus forms a layer of the output tensor.

In some variants of the invention, one of the dependent filter matrices is formed by multiplying one of the weights to be learned by the filter matrix with learning parameters. For the different implicit parameters of said dependent filter matrix, the same weight is multiplied by each learning parameter. In other variants, the weight is applied via an activation function, i.e. via a non-linear function such as a sigmoid function, e.g. an arctangent function. The weight can be the argument of the activation function and the result of the latter is applied in a calculation with, e.g. is multiplied by, a filter matrix with learning parameters in order to determine a dependent filter matrix. Alternatively, the argument of the activation function can be formed by applying in a calculation, e.g. by multiplying, a weight and a learning parameter and the result of the activation function constitutes an entry (implicit parameter) of one of the dependent filter matrices. In another embodiment, the entries of the output tensor are input into the activation function and a tensor calculated therewith is output as the result of this convolutional layer.

The weights to be learned are intended to establish a correlation between the different layers of a filter kernel. The weights thus create an interdependency between different layers of a filter kernel. This is intended to reduce the total number of values to be learned. Conventionally, this total number of values to be learned of a filter layer is usually equal to the total number of entries (=elements) of all filter kernels of this filter layer. In order to achieve a reduction of the number of values to be learned, a number of weights to be learned of all filter kernels plus a number of all learning parameters is smaller than a total number of elements of all filter kernels. For a more significant reduction of the number of values to be learned, the number of weights to be learned per filter kernel can be chosen so as to be smaller or equal to the number of dependent filter matrices of this filter kernel. It is thus possible to use exactly one weight to be learned for each dependent filter matrix of one of the filter kernels; alternatively, e.g., the same weight to be learned is used for a plurality of the dependent filter matrices of the same filter kernel.

Different implementations are described in the following which provide a substantial reduction in the number of values/parameters to be learned while simultaneously describing a suitable dependency within the filter kernels, whereby a high robustness is achieved in machine learning applications.

It can be provided that each filter kernel comprises only a single filter matrix with learning parameters or two or more filter matrices with learning parameters. All remaining dependent filter matrices of this filter kernel can be respectively defined by a weight to be learned and the filter matrix with learning parameters or by a plurality of weights applied in a calculation with the filter matrices with learning parameters. It can also be provided that the same weight to be learned is used for all or some of the dependent filter matrices of one of the filter kernels.

When at least one of the filter kernels comprises two or more filter matrices with learning parameters, the dependent filter matrices of this filter kernel can be formed by a combination of the filter matrices with learning parameters which is linked by the weights. For example, a dependent filter matrix can be represented as a linear combination of two or more filter matrices with learning parameters, which are respectively multiplied by a weight. The remaining filter kernels can be formed in the same manner or can differ in terms of the number of filter matrices with learning parameters they comprise.

The filter matrices with learning parameters of different filter kernels of the same convolutional layer can be different from or independent of one another. Alternatively, at least one of the filter kernels may not comprise its own filter matrix with learning parameters, but instead be formed depending on one or more filter matrices with learning parameters of one or more of the remaining filter kernels. In cases where filter kernels comprise two or more filter matrices with learning parameters, it is also possible for different filter kernels to share filter matrices with learning parameters and additionally comprise different filter matrices with learning parameters.

The same weight to be learned can optionally be used for a dependent filter matrix in each of a plurality of or all filter kernels. This further reduces the number of parameters to be learned while further improving robustness in machine learning applications.

Variants of the invention utilize a plurality of convolutional layers, in particular for deep learning implementations. At least some of the convolutional layers are formed as described in relation to the first convolutional layer. Different implementations described in the present disclosure can be chosen for different convolutional layers. A second input tensor for a second convolutional layer is formed from the output tensor of the first convolutional layer. In principle, the output tensor can be employed directly as a second input tensor, although it is also possible to use optional intermediate layers, for example an activation layer and/or a pooling layer. When applied to the output tensor or a tensor formed therefrom, the pooling layer forms, from a plurality of neighbouring values, a respective value for a new tensor, which can be the second input tensor or from which the second input tensor is calculated. In an average pooling, for example, an average of a plurality of neighbouring values is formed and used in the new tensor. In a max pooling, a respective maximum value of a plurality of neighbouring values is used in the new tensor. This permits a certain translational invariance in terms of features in the input tensor.

The second convolutional layer comprises a plurality of filter kernels, which are referred to as second filter kernels in order to differentiate them from the filter kernels of the first convolutional layer. By means of the second filter kernels, a second output tensor is calculated from the second input tensor. At least some of the weights to be learned of the filter kernels of the first convolutional layer can be simultaneously used as weights for determining dependent filter matrices of the second filter kernels. This allows a further parameter reduction. The filter kernels of the first and second convolutional layers can generally have different depths. In order to utilize common weights, it is thus expedient to adapt the weights of the first convolutional layer to a different depth of the second convolutional layer. To this end, it is possible to employ linear combinations of the weights used along a depth in the first convolutional layer in order to form the weights for a second filter kernel of the second convolutional layer. If, for example, the filter kernels of the first convolutional layer have the depth N and the second filter kernels have the depth 2N, then an average value of two weights can be interpolated between the same, whereby a weight vector of the depth or size 2N is generated and the local order of the weights for the second convolutional layer/filter layer is maintained.

The learning parameters can be precisely the entries of a filter matrix with learning parameters, although it is alternatively possible for the entries of this filter matrix to be merely formed by means of the learning parameters. For example, two entries of this filter matrix can be determined by the same learning parameter or entries of this filter matrix can be formed by linear combinations of the learning parameters.

The learning parameters and weights to be learned do not have to be determined directly by means of training data. Rather, it is also possible to derive values for the learning parameters and weight to be learned from the filter kernels of a conventional, ready-trained machine learning algorithm. For example, by means of a data fitting using a loss function or a regression adaptation, it is possible to determine values of the learning parameters and weights to be learned with which the filter kernels of the ready-trained machine learning algorithm are replicated as authentically as possible.

If the learning parameters and weights to be learned are determined using training data, "pruning" can also be utilized: in this process, initially determined values of the weights are thinned out, i.e. as many entries as possible of the corresponding weight matrix are set to 0. This reduces the complexity of the weight matrix and allows speed advantages to be achieved.

Possible applications of a machine learning algorithm that exploits the method described here comprise image analysis as well as speech processing, text processing or audio processing. In the context of image analysis, the output tensor cited herein can be relayed to one or more deeper layers of the neural network, the final result being output, for example, in the form of a result image, a classification, segmentation, object identification, information message to a user, or a command. The command can in particular be a command for controlling a measurement device, for example a microscope with which the image was captured.

BRIEF DESCRIPTION OF THE DRAWINGS

Further advantages and features of the invention are described in the following with reference to the attached schematic figures.

FIG. 1 is a schematic illustration of a convolutional layer of the prior art;

FIG. 2 is a schematic illustration of a filter kernel of the convolutional layer of FIG. 1;

FIG. 11 is a table illustrating the number of parameters to be learned in machine learning applications.

As a rule, identical components and components that function in an identical manner are designated in the figures by the same reference signs.

DETAILED DESCRIPTION

Figure 3:
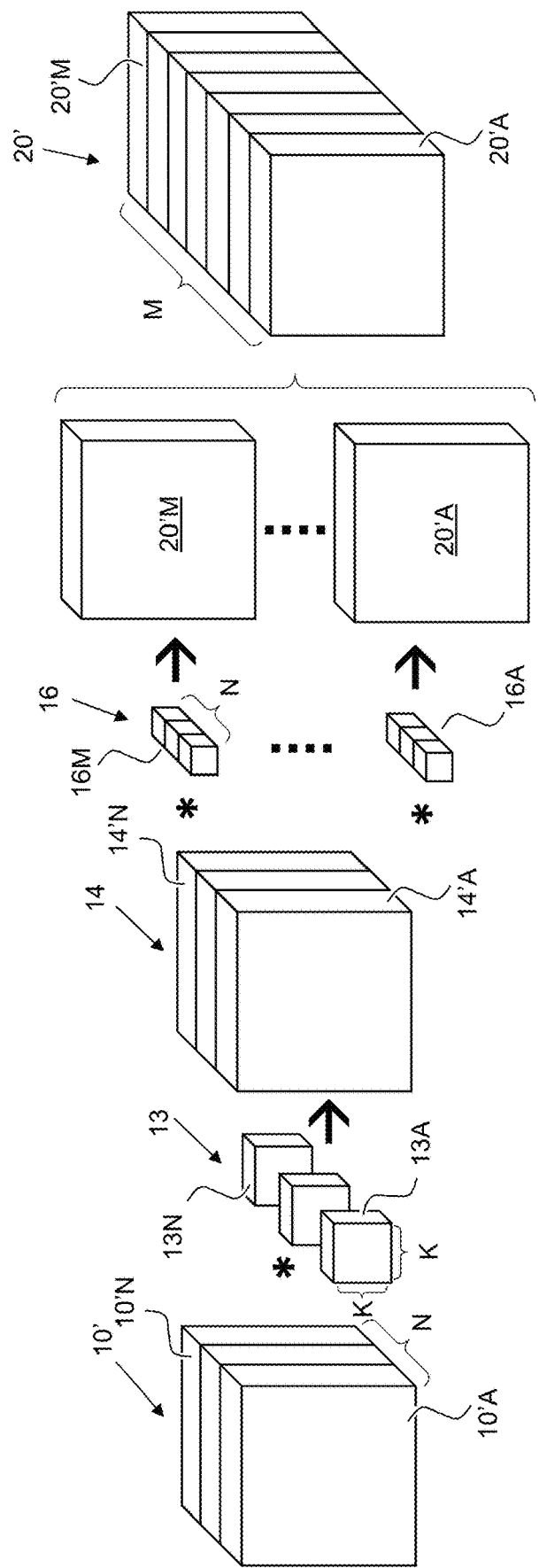
FIG. 3 is a schematic illustration of a convolution calculation according to depthwise separable convolutions of the prior art.
Figure 4:
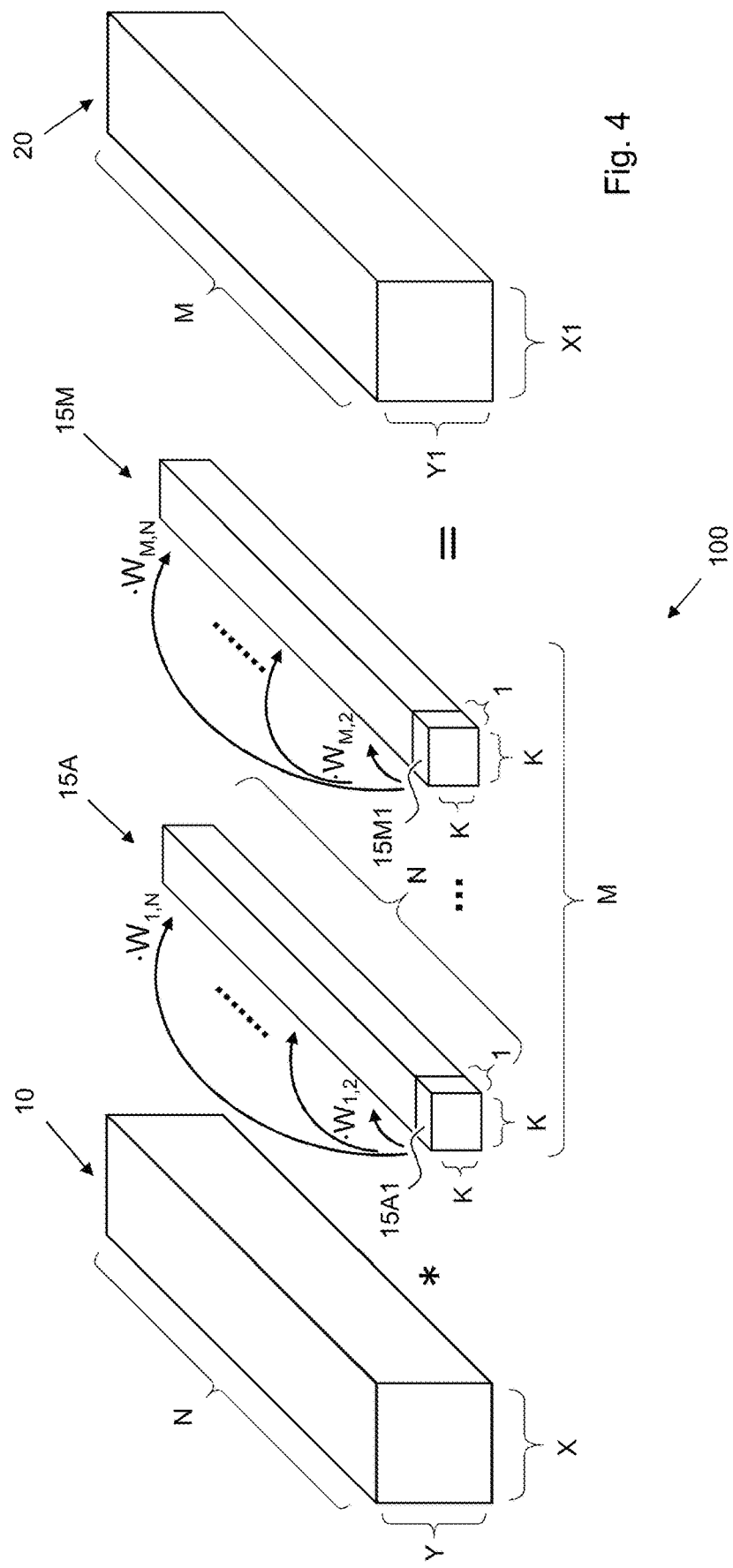
FIG. 4 is a schematic illustration of an example embodiment of a convolutional layer used according to the invention.

FIG. 4 illustrates an example embodiment of a method according to the invention in which a convolutional neural network is implemented. The neural network can be part of a machine learning algorithm. A first convolutional layer 100 of the neural network, which calculates an output tensor 20 from an input tensor 10, is schematically illustrated. The denomination first convolutional layer 100 is not intended to define that the convolutional layer in question is applied first in the neural network; on the contrary, other convolutional layers can be executed before the illustrated first convolutional layer 100. The first convolutional layer 100 comprises a plurality of filter kernels 15A to 15M. A convolution of each of the filter kernels 15A to 15M with the input tensor 10 is calculated in order to form the output tensor 20.

The input tensor 10 can be similar or identical to the input tensor 10' of FIG. 1. The output tensor 20 has the dimensions Y1×X1×M, wherein Y1 and X1 can be the same or different relative to the dimensions Y and X of the input tensor 10. The sizes of Y1 and X1 can depend, for example, on a padding or stride, a padding describing an adding of numbers (e.g. zeros) at the input tensor for the convolution calculations and a stride describing a jump/step size in the convolution calculation.

The filter kernels 15A to 15M respectively have the dimensions K×K×N. The embodiments described here can also be generalized in such a manner that the filter kernels have the dimensions K1×K2×N and K1 and K2 can be the same or different. In principle, the filter kernels 15A to 15M can also have different values for K or K1 and K2.

As described above with reference to FIG. 2, preliminary research relating to the invention has determined that the different K×K×1 filter matrices of a conventional filter kernel exhibit a high correlation with one another. This insight can be exploited in order to reduce the number of parameters to be learned of a filter kernel without significantly reducing the amount of information that is extracted from the input tensor by the filter kernel. This can also improve the robustness of the filter in cases where the neural network is used in a machine learning algorithm.

Figure 5:
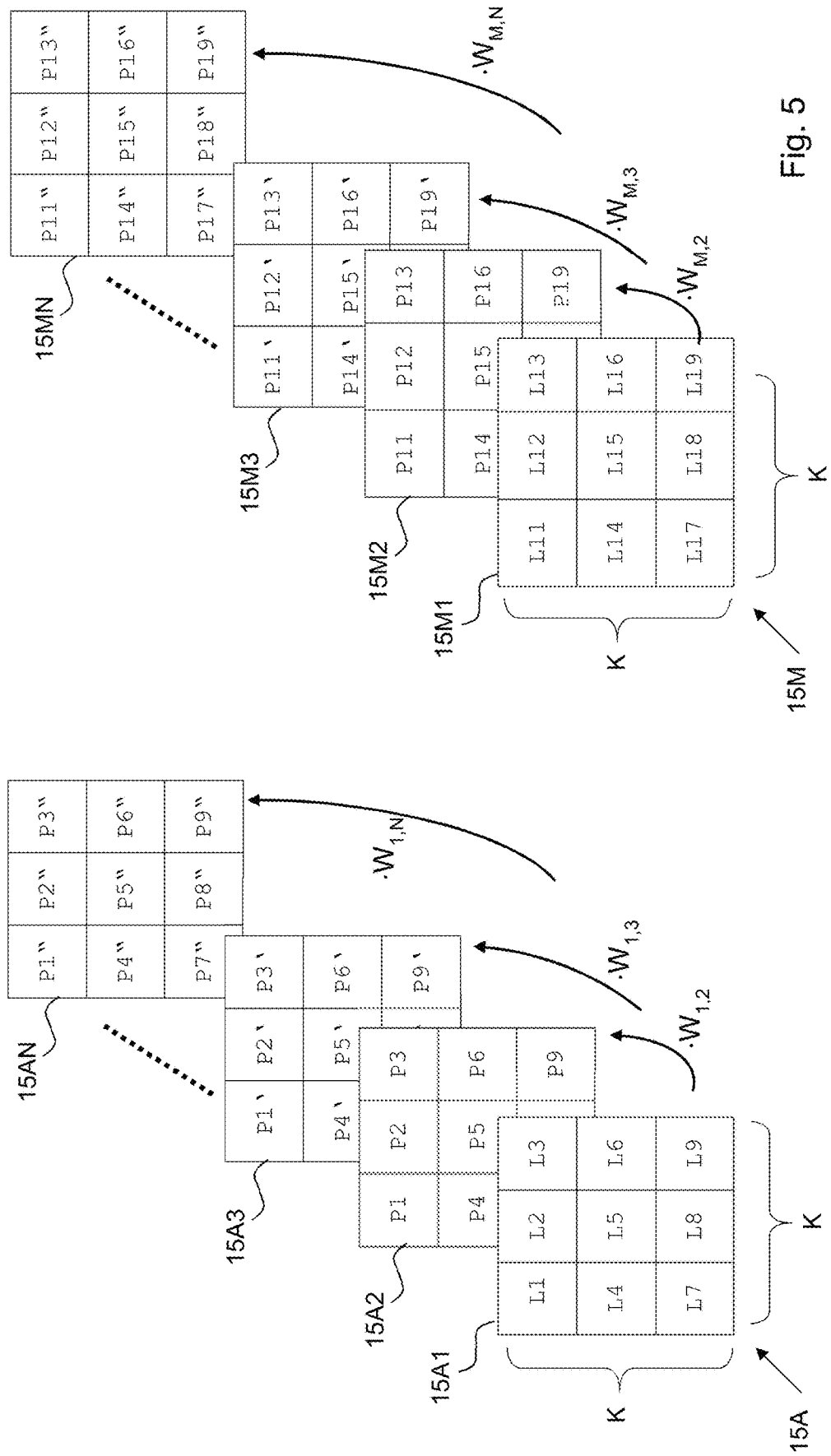
FIG. 5 is a schematic illustration of a filter kernel of FIG. 4.

FIG. 5 illustrates the K×K×N entries/elements of the filter kernel 15A as well as the corresponding entries of the filter kernel 15M of FIG. 4. A filter matrix or filter layer 15A1 of the filter kernel 15A is formed from learning parameters L1-L9. Values for the learning parameters L1-L9 are learned in a training step of the machine learning algorithm using training data. The remaining filter matrices 15A2 to 15AN constitute dependent filter matrices formed from implicit parameters P1-P9, P1'-P9', . . . , P1''-P9''. These implicit parameters are not learned as freely determinable values by means of a training step of the machine learning algorithm. Rather, they are predetermined by computationally adjusting the learning parameters L1-L9 with weights W=(W$_{1,2}$, W$_{1,3}$, . . . , W$_{1,N}$). Specifically, the weights W are multiplied by the filter matrix 15A in this example in order to form the dependent filter matrices 15A2 to 15AN. The entries of the dependent filter matrix 15A2 are accordingly defined as: P1=L1*W$_{1,2}$, P2=L2*W$_{1,2}$, . . . , P9=L9*W$_{1,2}$.

Each of the filter kernels 15A-15M can thus be represented as:

$$F_{y,x,n} = W_n \cdot G_{y,x} \text{ with } W_n \in \mathbb{R},$$

where F$_{y,x,n}$ designates one of the filter kernels, W$_n$ designates the weights for this filter kernel and G$_{y,x}$ indicates the filter matrix with learning parameters of this filter kernel. The indices x and y can run from 1 to K, while n runs from 1 to N.

The weights W are learned in a training step of the machine learning algorithm. The number of parameters for which values are to be learned in a training step is thus merely K*K+N for the filter kernel 15A, which is significantly below the number of its elements, i.e. K*K*N. The preceding descriptions can be applied analogously to the remaining filter kernels, in particular to the filter kernel 15M illustrated in FIG. 5 with the learning parameters L11-L19 and the implicit parameters P11-P19, P11'-P19', . . . , P11''-P19'', which are defined via the weights W$_{M,2}$, W$_{M,3}$, . . . , W$_{M,N}$. The first column of weights (W$_{1,1}$, . . . , W$_{M,1}$) can also be omitted or be set to a constant value, whereby the number of parameters to be learned per filter kernel is not K*K+N, but K*K+N−1.

Which of the layers of the filter kernels 15A . . . 15M is a filter matrix with learning parameters L1-L9 can in principle be chosen in any manner and it does not have to be the first layer of the filter kernel.

It is noted for the sake of clarity that, in the prior art, the term "weights" is often used in relation to filter kernels for the learning parameters L1-L9. In the prior art, the weights thus directly constitute the entries of a filter kernel so that, in the prior art, the number of such weights usually equals the number of elements of the filter kernel, i.e. K*K*N. In the invention, on the other hand, the weights W do not form the entries of the filter kernel 15A, but are rather applied in a calculation with the convolution matrix 15A1 containing the learning parameters L1-L9 in order to form entries in the filter kernel 15A.

Since the weights W are used together with a filter matrix with learning parameters, the filter kernel 15A of FIG. 5 can resemble the filter kernel of FIG. 2, wherein, however, the number of independent parameters of the filter kernel is substantially reduced. The remaining filter kernels of the convolutional layer 100 can be formed in the same manner as the filter kernel 15A. There can thus be a vector of weights for each of the respective filter kernels 15A-15M, i.e. which collectively form a weight matrix W. Examples of weight matrices are shown in FIGS. 6 to 10.

Figure 6:
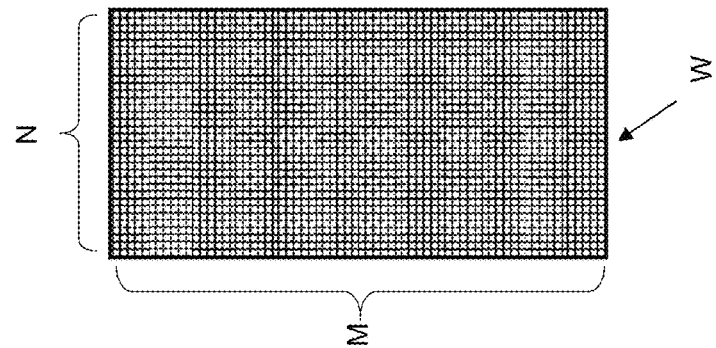

FIG. 6 shows a weight matrix W with the dimensions M×N. The N entries of a row thus form the weights for one of the filter kernels 15A-15M, wherein the weight matrix has a total of M rows, corresponding to the number of filter kernels 15A-15M. In the example of FIG. 6, all entries of the weight matrix W are freely learnable parameters. The filter kernels 15A-15M are thus independent of one another. The number of weights to be learned for the convolutional layer 100 is thus N*M, or (N−1)*M if the weights for, for example, the filter kernel 15A run from W$_{1,2}$ to W$_{1,N}$ as shown in FIG. 5. In this example, the total number of parameters to be learned of the convolutional layer 100 comprises said number of weights to be learned plus the number of learning parameters, which can be K$^2$*M here.

Figure 7:
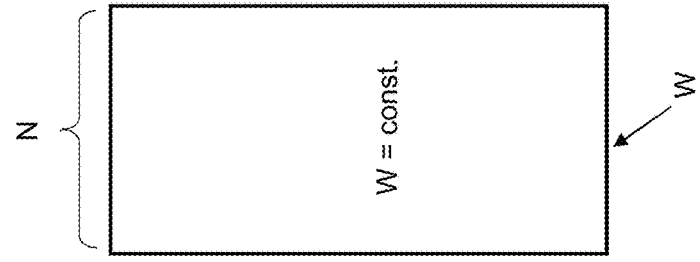

FIG. 7 shows an example of the weight matrix W, wherein all weights are set to the same value. This constant can be a parameter to be learned or a fixed predetermined number. This allows many operations to be simplified, accelerated or even omitted altogether. This yields an extreme saving in terms of parameters and time. The number of parameters is reduced approximately by a factor of 75 or more, depending on the CNN architecture. In light of the large parameter reduction, a model with this convolutional layer does not perform as well as the initial/source model or a model according to FIG. 6. This can, however, be advantageous for less complex tasks, since a good and usually better generalizability is achieved here even with very small data sets (which are typical, e.g., in the field of microscopy).

Figure 8:
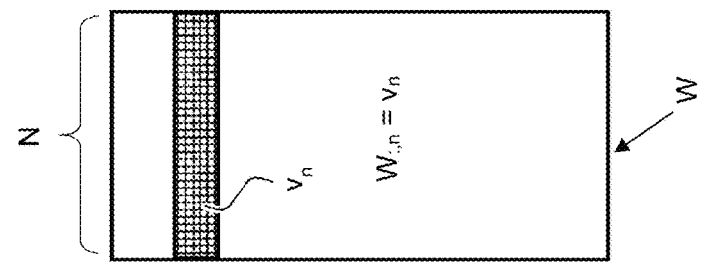

Between the extremes of FIGS. 6 and 7, gradations are possible in which the number of parameters is smaller than in FIG. 6 and larger than in FIG. 7. The case of FIG. 8 shows the use of a weight matrix W whose entries are constant column-wise according to $w_{m,n}=v_n$, i.e. all entries of the same column have the same value. A given channel of the input tensor 10 is thereby weighted equally for all filter kernels 15A-15M. This corresponds to a filter-independent weighting of the input tensor and can again be implemented in a storage-efficient and time-efficient manner, in particular with 1×1 convolutions in CNNs.

Figure 9:
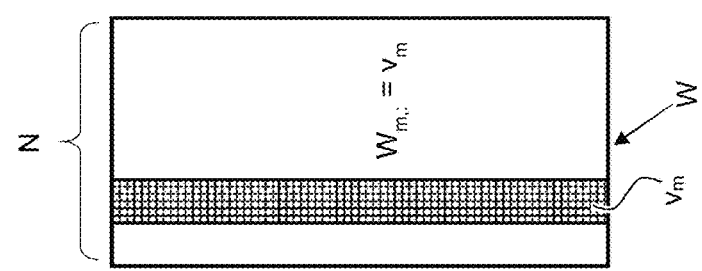

Analogously, FIG. 9 shows the use of a weight matrix W whose entries are $w_{m,n}=v_m$, i.e. all entries in a row of W have the same value to be learned. This means that all channels of the input tensor 10 are weighted equally for one of the filter kernels. This thus effectively leads to a weighting of the channels in the output tensor. This can again be implemented very efficiently in a CNN, whereby, besides the saving in terms of parameters, a significant speed advantage can also be achieved.

Figure 10:
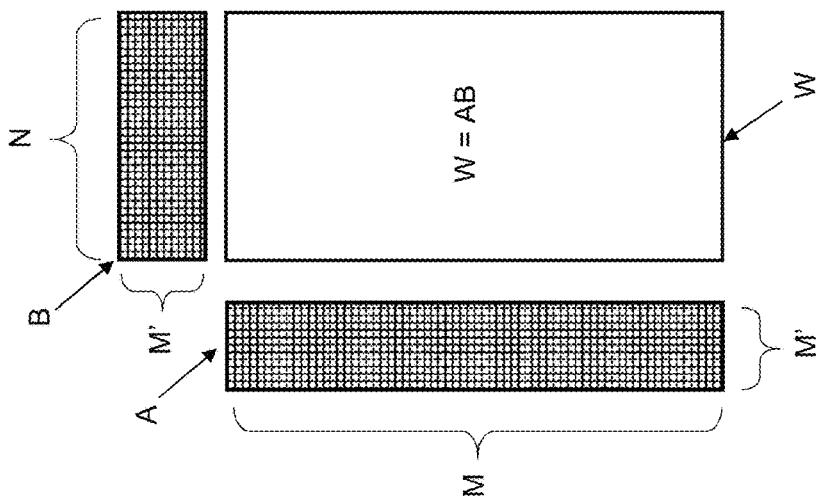
FIGS. 6-10 are respective schematic illustrations of weights for determining the filter kernels of FIG. 4.

The weight matrix or weight block W can also be represented by a low-rank approximation, for example by a matrix product W=AB, where W is an M×N matrix, A is an M×M' matrix and B is an M'×N matrix, cf. FIG. 10. The entries of the matrices A and B are weights to be learned in a training step/weight parameters. The entries of the weight matrix W are thus linear combinations of the weight parameters of the matrices A and B. This configuration of the weight matrix W is motivated by the observation that, in the case of a weight matrix W as shown in FIG. 6, the learned weights correlate strongly across different filter kernels. M' is smaller than N, for example smaller than 0.2*N or smaller than 0.1*N. M' can also be defined as <0.5M in order to reduce the number of parameters vis-à-vis the weight matrix of FIG. 6. In practice, CNNs with the weight matrix of FIG. 10 and a value of M'=0.1M will expectedly still exhibit a performance comparable to the weight matrix of FIG. 6, despite a parameter reduction by a factor of approximately 5 having been achieved vis-à-vis the weight matrix of FIG. 6. Compared to standard convolutional layers, this corresponds to a parameter reduction by a factor of approximately 50.

In order to regularize the learning process in low-dimensional space, the rows of the matrix B can be orthonormalized. This can be achieved with a regularization loss function L, $L=\|BB^T-I\|^F$, wherein BT is the transposed matrix of B, I is the identity matrix and $\|\cdot\|_F$ is the Frobenius norm. The regularization loss function is incorporated in the optimization of the CNN training. A kind of principal component analysis (PCA) of the weight matrix W is thereby learned.

In variants of the weight matrix of FIG. 10, the weights of the weight matrix W are described, as in FIG. 10, by a combination/linear combination of weight parameters. These weight parameters are to be learned in a training step. However, in contrast to FIG. 10, the entries of the weight matrix W do not have to be representable as a matrix product of two matrices A and B, but can be linked in essentially any other manner.

FIG. 11 lists for different examples of weight matrices W the number of parameters to be learned and the extent of the parameter reduction vis-à-vis a conventional convolutional layer (standard CNN), in which the number is $K^2*M*N$. The factor of the parameter reduction is estimated for the case in which K=3 and N>>$K^2$, which occurs frequently in practice.

The examples of weight matrices W shown in FIGS. 6 to 10 serve the purpose of illustration, it being clear that variants of the latter are also possible. In more general terms, the filter kernels can be defined by: exactly one filter matrix with learning parameters or a plurality of filter matrices with learning parameters per filter kernel; and a weight block/ weight matrix W with the weights to be learned. The number of weights to be learned can be in particular less than or equal to the total number of dependent filter matrices of all filter kernels.

If the size (number of entries) of the weight matrix W is larger than the number of weights to be learned, this is intended to be understood to mean that remaining entries of the weight matrices are defined by constants and/or by a dependency on one or more of the weights to be learned.

If two or more filter layers are used, then these can also share weights. This means that at least some of the weights described above are also used in one or more other filter layers. With reference to FIG. 10, in particular the weights of the matrix B can be used for a plurality of filter layers, while these filter layers comprise different/mutually independent matrices A.

Example Embodiment of a Microscope

Figure 12:
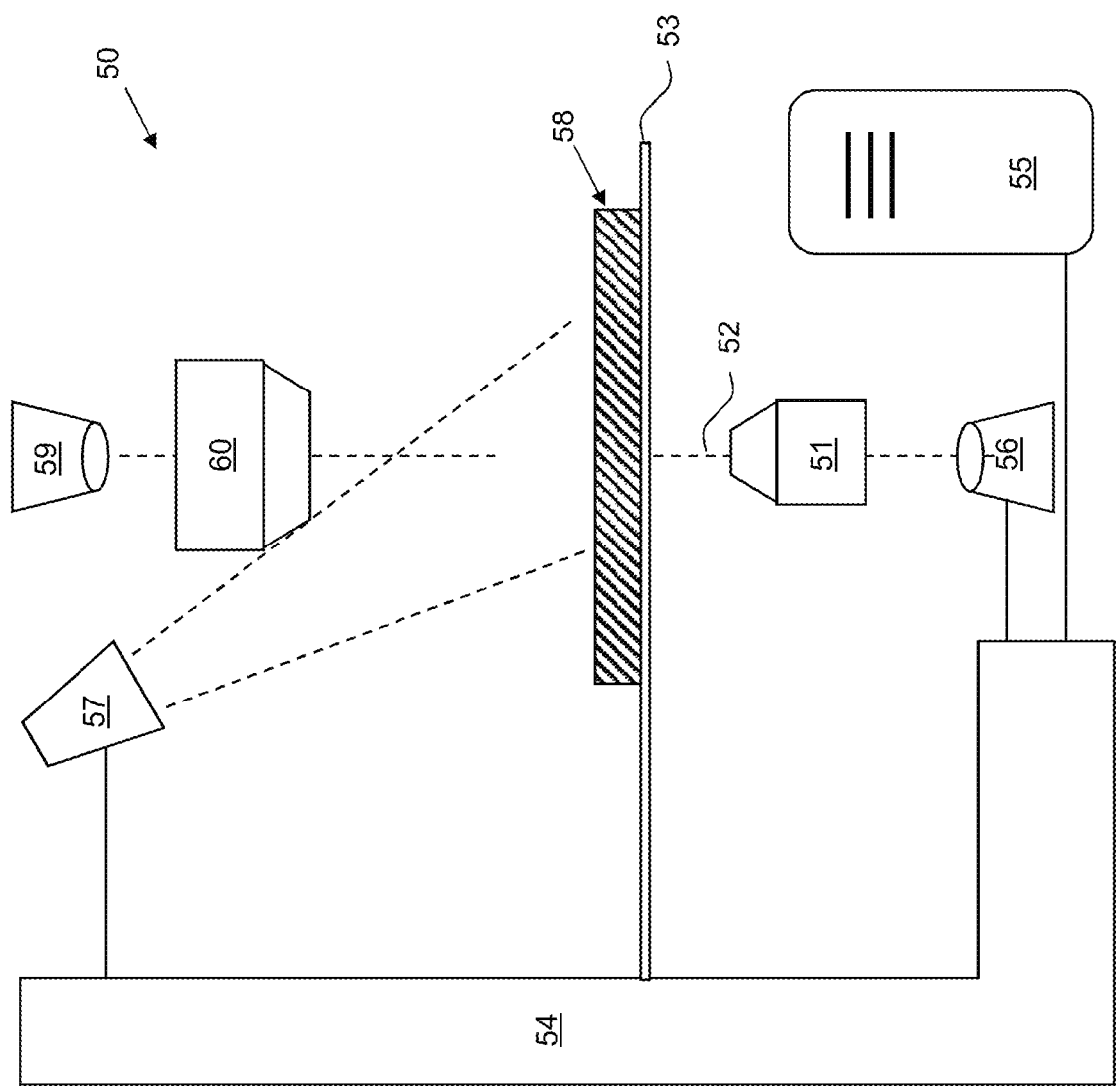
FIG. 12 is a schematic illustration of an example embodiment of a microscope system according to the invention.

FIG. 12 shows schematically an example embodiment of a microscope 50 according to the invention. The microscope 50 includes a light source 59 and a condenser 60 for illuminating a sample 58 positioned on a sample stage 53. Detection light emanating from the sample 58 is guided along an optical axis 52 with an objective 51 to a camera 56 for capturing a sample image. An overview camera 57, with which an overview image of the sample 58 can be captured, can optionally also be supported via a microscope stand 54. A computing device 55 is configured to process a captured microscope image (i.e. a sample image or overview image) and to form an input tensor therefrom, which is used in a calculation in a neural network of a machine learning algorithm as described in the foregoing. In this connection, the computing device 55 is configured to execute the steps described with reference to FIGS. 4 to 11. The machine learning algorithm can in particular be trained to perform a classification of the microscope image, wherein potential classes can include, for example, one or more of: sample, background, cover slip, sample receptacle, cover slip edge, sample receptacle edge, sample carrier labelling. Alternatively or additionally, the machine learning algorithm can be trained to perform a segmentation or detection in which, for example, the microscope image is segmented into different areas and/or specific objects in the image are identified and localized, for example sample areas, shadows or light reflections. The machine learning algorithm can also be trained for an image-to-image mapping in which the result is an output image.

The computing device 55 can also be used in another microscope which, in contrast to the illustrated microscope, operates, for example, according to a different measurement principle or is a scanning or electron microscope. A computing device as described herein can also be provided for image analysis in devices other than microscopes.

By means of the described neural network, robust results, which are very stable vis-à-vis variations in the input data, can be achieved in machine learning applications while the required computational expenditure is advantageously relatively low. Dedicated hardware is not required. The generalizability of a machine learning algorithm based on this neural network is high, i.e. the algorithm works reliably and is data-efficient even with data not observed in the training. Moreover, with the described filter kernels, a training of a machine learning algorithm "from scratch", i.e. without a pre-training with reference data, is readily possible. As a result of the special parameter reduction method described here, the performance of the machine learning algorithm may potentially even be enhanced.

LIST OF REFERENCE SIGNS 10, 10' Input tensor
12A-12M Filter kernels of the prior art
12M1-12MN Filter matrices of the filter kernel 12M
13, 13A-13N Filter kernels of a depthwise separable convolution of the prior art
Intermediate tensor calculated with the filter kernels 13
15A-15M Filter kernels
15A1-15AN Filter matrices of the filter kernel 15A
15M1-15MN Filter matrices of the filter kernel 15M
16, 16A-16M Filter kernels of a depthwise separable convolution of the prior art
20, 20' Output tensor
20'A-20'M Layers of the output tensor 20'
50 Microscope
51 Objective
52 Optical axis of the objective 51
53 Sample stage
54 Microscope stand
55 Computing device
56 Camera
57 Overview camera
58 Sample
559 Light source
60 Condenser
100 Convolutional layer
100' Convolutional layer of the prior art
A Matrix for determining the entries of the weight matrix W
B Matrix for determining the entries of the weight matrix W
K Height and width of the filter kernels
M Depth of the output tensor; number of filter kernels, number of rows/height of the weight matrix W
M' Number of columns of the matrix A; number of rows of the matrix B
N Depth of the input tensor and of the filter kernels, number of columns/width of the weight matrix W
L1-L9, L10-L19 Learning parameters
P1-P9, P1'-P9', P1"-P9", P11-P19, P11-P19', P11"-P19" Implicit parameters
X Width/number of columns of the input tensor
Y Height/number of rows of the input tensor
$v_n$ Row of the weight matrix W, i.e. vector with weights
$v_m$ Column of the weight matrix W, i.e. vector with weights
W Weights, weight matrix

The invention claimed is:

1. A method for processing microscope images in order to generate an image processing result, comprising:
implementing a convolutional neural network, wherein a first convolutional layer of the convolutional neural network calculates an output tensor from an input tensor formed from a microscope image, the output tensor being input into one or more further layers of the convolutional neural network in order to calculate the image processing result,
wherein the first convolutional layer comprises a plurality of filter kernels,
wherein
at least several of the filter kernels are respectively representable by:
at least one filter matrix with learning parameters and dependent filter matrices with implicit parameters, which are determined using the learning parameters and one or more weights to be learned,
wherein the filter matrices with learning parameters of different filter kernels are different from one another, and different layers of the output tensor are calculated by different filter kernels.

2. The method according to claim 1,
wherein
the image processing result is a result image, a classification, an image segmentation, an object identification or a command with which a microscope with which the microscope image was captured is controlled.

3. The method according to claim 1,
wherein
one of the dependent filter matrices of one of the filter kernels is formed by multiplying one of the weights to be learned by the filter matrix with learning parameters of the same filter kernel, and
a number of weights to be learned of all filter kernels plus a number of all learning parameters is smaller than a total number of elements of all filter kernels.

4. The method according to claim 1
wherein
each filter kernel comprises only a single filter matrix with learning parameters and otherwise comprises only dependent filter matrices, which are respectively defined by a weight to be learned and the filter matrix with learning parameters.

5. The method according to claim 1,
wherein
the same weight to be learned is used for all dependent filter matrices of one of the filter kernels.

6. The method according to claim 1,
wherein
the filter kernels differ in terms of their respective filter matrix with learning parameters.

7. The method according to claim 1,
wherein
the same weight to be learned is used for a dependent filter matrix in each of a plurality of filter kernels.

8. The method according to claim 1,
wherein
the filter kernels are defined by:
a respective filter matrix with learning parameters per filter kernel and
a weight block with the weights to be learned, wherein the number of weights to be learned is less than or equal to the total number of dependent filter matrices of all filter kernels.

9. The method according to claim 8,
wherein
the weight block is representable as a matrix of the dimension M×N, which is formed as a matrix product of two matrices with dimensions M×M' and M'×N, wherein these two matrices consist of the weights to be learned.

10. The method according to claim 1, wherein
at least one of the filter kernels comprises two or more filter matrices with learning parameters and the dependent filter matrices of this filter kernel are formed by a combination of the filter matrices with learning parameters which is linked by the weights.

11. The method according to claim 1, wherein
each filter kernel is formed by a body to be convolved with the input tensor, the body being formed by the at least one filter matrix with learning parameters and the weights to be learned.

12. The method according to claim 1, wherein
one of the filter kernels comprises a learning parameter body and a weights body, which are successively convolved with the input tensor in order to calculate a layer of the output tensor,
wherein the learning parameter body is formed by the at least one filter matrix with learning parameters, and
wherein the weights body is formed by the weights to be learned.

13. The method according to claim 1,
wherein a second input tensor for a second convolutional layer is formed from the output tensor of the first convolutional layer,
wherein the second convolutional layer comprises second filter kernels with which a second output tensor is calculated from the second input tensor,
wherein
at least some of the weights to be learned of the filter kernels of the first convolutional layer are simultaneously used as weights for determining dependent filter matrices of the second filter kernels of the second convolutional layer.

14. A machine-readable storage medium with program code stored thereon, wherein, when executed by a computing device, the program code is configured to effect carrying out a method for processing microscope images in order to generate an image processing result, the method comprising:
implementing a convolutional neural network, wherein a first convolutional layer of the convolutional neural network calculates an output tensor from an input tensor formed from a microscope image, the output tensor being input into one or more further layers of the convolutional neural network in order to calculate the image processing result,
wherein the first convolutional layer comprises a plurality of filter kernels,
wherein
at least several of the filter kernels are respectively representable by:
at least one filter matrix with learning parameters and dependent filter matrices with implicit parameters, which are determined by the learning parameters and one or more weights to be learned,
wherein the filter matrices with learning parameters of different filter kernels are different from one another, and
different layers of the output tensor are calculated by different filter kernels.

15. A microscope for analyzing a sample, comprising
a light source for illuminating the sample,
an objective for guiding detection light from the sample,
a camera for capturing a microscope image using the detection light from the objective, and
a computing device, which is configured to process the microscope image and output an image processing result,
wherein
the computing device is configured to calculate an input tensor from the microscope image and to execute a method for processing microscope images in order to generate an image processing result, the method comprising:
implementing a convolutional neural network, wherein a first convolutional layer of the convolutional neural network calculates an output tensor from the input tensor, the output tensor being input into one or more further layers of the convolutional neural network in order to calculate the image processing result,
wherein the first convolutional layer comprises a plurality of filter kernels,
wherein
at least several of the filter kernels are respectively representable by:
at least one filter matrix with learning parameters and dependent filter matrices with implicit parameters, which are determined by the learning parameters and one or more weights to be learned,
wherein the filter matrices with learning parameters of different filter kernels are different from one another, and
different layers of the output tensor are calculated by different filter kernels.

* * * * *